(12) United States Patent
Nishioka et al.

(10) Patent No.: US 6,512,829 B1
(45) Date of Patent: Jan. 28, 2003

(54) KEY DISTRIBUTION METHOD AND SYSTEM IN SECURE BROADCAST COMMUNICATION

(75) Inventors: Mototsugu Nishioka, Kawasaki; Hisashi Umeki, Yokohama; Susumu Matsui, Machida, all of (JP)

(73) Assignee: Hitach, Ltd., Tokyo (JP)

( * ) Notice: Subject to any disclaimer, the term of this patent is extended or adjusted under 35 U.S.C. 154(b) by 0 days.

(21) Appl. No.: 09/520,627

(22) Filed: Mar. 7, 2000

Related U.S. Application Data

(63) Continuation of application No. 08/882,339, filed on Jun. 25, 1997, now Pat. No. 6,041,408.

(30) Foreign Application Priority Data

| Jun. 28, 1996 | (JP) | ................................. 8-168975 |
| Aug. 9, 1996 | (JP) | ................................. 8-210811 |
| Aug. 19, 1996 | (JP) | ................................. 8-217050 |
| Oct. 11, 1996 | (JP) | ................................. 8-269613 |

(51) Int. Cl.$^7$ ............................................. H04L 9/00
(52) U.S. Cl. ...................... 380/278; 380/262; 713/163; 713/171
(58) Field of Search ................................ 713/171, 162, 713/163; 380/262, 278, 279, 280, 283, 284

(56) References Cited

U.S. PATENT DOCUMENTS

| 4,850,017 | A | | 7/1989 | Matayas et al. |
| 5,369,705 | A | | 11/1994 | Bird et al. |
| 5,592,552 | A | | 1/1997 | Fiat |
| 5,663,896 | A | | 9/1997 | Aucsmith |
| 5,708,714 | A | | 1/1998 | Lopez et al. |
| 5,729,608 | A | | 3/1998 | Janson et al. |
| 6,041,408 | A | * | 3/2000 | Nishioka et al. ............ 713/171 |

OTHER PUBLICATIONS

*IEEE Trans Commun.*, COM–29, No. 6, pp. 778–786, 1981.
*Trans. IEICE*, J65–D, No. 9, pp. 1151–1158, 1982.
Lee et al., *SCIS86*, 1986.
*IEICE Technical Report*, ISEC93–34, Oct. 1993.
*Commun. of the ACM*, Vol. 21, No. 2, pp. 120–126, 1987.

* cited by examiner

*Primary Examiner*—Gilberto Barron, Jr.
*Assistant Examiner*—Paul E. Callahan
(74) *Attorney, Agent, or Firm*—Antonelli, Terry, Stout & Kraus, LLP

(57) ABSTRACT

A key distribution method and system are disclosed in which a sender and receivers share a common key information for performing a secure broadcast communication. By use of a center side apparatus, a center generates key information of a receiver in association with a subset inclusive of two or more elements of a proper finite set S1 on the basis of a space determined by a subset inclusive of two or more elements of another finite set S2. A sender side apparatus, a sender makes the multi-address transmission of key distribution data W inclusive of data generated corresponding to each element of the finite set S1 and data generated corresponding to a set of plural receivers through a communication network. By use of a receiver side apparatus, a receiver generates common key information between the sender and the receiver from the key distribution data W and the key information of the receiver.

28 Claims, 8 Drawing Sheets

FIG.11

[KEY GENERATION]   CONFIDENTIAL INFORMATION OF CENTER

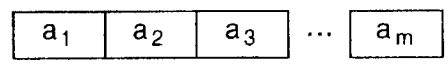

↓ SELECT k INFORMATION

GENERATE KEY INFORMATION
Kx OF ENTITY x

COMBINATION SELECTING k INFORMATION FROM AMONG m INFORMATION : $\binom{m}{k} = \dfrac{m!}{(m-k)!k!}$

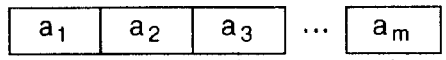

↓ ↓ ↓ ↓

PUBLIC INFORMATION OF CENTER     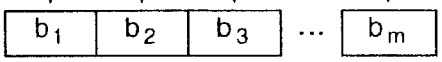

[KEY DISTRIBUTION]

SENDER     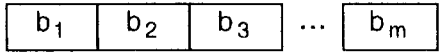

RANDOM NUMBER r → ↓ ↓ ↓ ↓

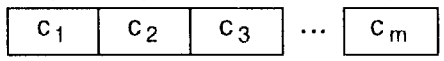

MULTI-ADDRESS TRANSMISSION

RECEIVER     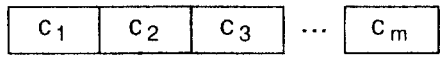

↓ SELECT k INFORMATION

CALCULATE COMMON KEY K BY USE
OF KEY INFORMATION Kx OF ENTITY x

KEY DISTRIBUTION METHOD AND SYSTEM IN SECURE BROADCAST COMMUNICATION

This application is a Continuation Application of U.S. patent application Ser. No. 08/882,339 filed on Jun. 25, 1997, now U.S. Pat. No. 6,041,408.

BACKGROUND OF THE INVENTION

The present invention relates to a key distribution method and system in secure broadcast communication.

Up to now, several methods have been proposed in regard to secure broadcast communication (or key management).

For example, a copied key method disclosed by S. J. Kent, "Security requirement and protocols for a broadcast scenario", IEEE Trans. Commun., COM-29, 6, pp. 778–786 (1981) is fundamental. The copied key method is the simple extension of the conventional one-to-one cryptographic individual communication to a multi-address communication. The copy of one kind of key is distributed to a sender and a plurality of normal receivers. The sender enciphers information by use of the copied key and transmits the enciphered information. The normal receiver deciphers the information by use of the same copied key.

The other methods include (i) a secure broadcast communication method disclosed by K. Koyama, "A Cryptosystem Using the Master Key for Multi-Address Communication", Trans. IEICE, J65-D, 9, pp. 1151–1158 (1982) which uses a master key alternative to RSA individual key, (ii) a key distribution system disclosed by Lee et al., "A Multi-Address Communication Using a Method of Multiplexing and Demultiplexing", the Proc. of the 1986 Symposium on Cryptography and Information Security, SCIS86 (1986) which is based on the multiplexing and demultiplexing of information trains using the Chinese reminder theorem, and (iii) a system disclosed by Mambo et al., "Efficient Secure Broadcast Communication Systems", IEICE Technical Report, ISEC93-34 (October 1993).

According to the system for performing the multiplexing and demultiplexing of information trains by use of the Chinese reminder theorem, the following processes are performed.

(1) Key Generating Process

For a receiver $i$ ($1 \leq i \leq r$) are generated $s$ compromise integers $g_1, g_2, \ldots, g_s$ ($r \leq s$) and $g_i$ is distributed to the receiver $i$ as confidential information of the receiver $i$ beforehand.

(2) Enciphering Process

It is assumed that s information trains to be multiplexed are $M_1, M_2, \ldots, M_s$. A sender calculates a multiplexed transmit sentence F in accordance with $$F = \sum_{i=1}^{k} A_i G_i M_i \bmod G$$

and makes the multi-address transmission of F, wherein G, $G_i$ and $A_i$ are the least integer $A_i$ which satisfies $$G = \prod_{i=1}^{k} g_i,$$

$G_i = G/g_i$,
$A_i G_i \equiv 1 (\bmod\ g_i)$.

(3) Deciphering Process

The receiver $i$ demultiplexes $M_i$ from F by use of $g_i$ in accordance with $M_i = F \bmod g_i$ According to the system disclosed by Mambo et al., "Efficient Secure Broadcast Communication Systems", IEICE Technical Report, ISEC93-34 (October 1993), the following processes are performed.

(1) Key Generating Process

A reliable center generates the following information.
Confidential information:

$P=2p+1, Q=2q+1$:prime number (p,q:prime number)

$e_i \epsilon Z, 0 < e_i < L (1 \leq i \leq m)$

Public information:

$g \epsilon Z,\ 0 < g < N$ $N = PQ$ $v_i = g^{e_i} \bmod N (1 \leq i \leq m)$.

The center calculates $s_\sigma$ satisfying $$S_\sigma = \sum_{i=1}^{k} e_{\sigma(i)} \equiv 1 (\bmod L)$$

for $\sigma \epsilon S$ and distributes $s_\sigma$ as confidential information of a receiver $U_\sigma$, wherein set S={f|one-to-one map f: A={1, 2, ..., k}→B={1, 2, ..., m}, m>k}.

(2) Key Distribution Process (i) A sender randomly selects an integer $r$ to calculate $z_i = v_i^r \bmod N (1 \leq i \leq m)$ with the object of sharing a common key $K = g^r \bmod N$ in common with the receiver and makes the multi-address transmission of $z_i$ ($1 \leq i \leq m$).

(ii) The receiver $U_\sigma$ calculates the common key K in accordance with $$K = \left(\prod_{i=1}^{k} z_{\sigma(i)}\right)^{S_\sigma} \bmod N.$$

In the above-mentioned key distribution based on the multiplexing method using the Chinese reminder theorem, the length of key distribution data becomes large in proportion to the number of receivers since the key distribution data for individual users are transmitted in a serially arranged manner. This offers a problem from an aspect of efficiency in the case where several millions of receivers are made an object as in a broadcasting satellite service.

On the other hand, in the system disclosed by Mambo et al., "Efficient Secure Broadcast Communication Systems", IEICE Technical Report, ISEC93-34 (October 1993), the length of key distribution data can be reduced even in the case where the number of receivers is large. However, this system has a problem in security that if receivers conspire with each other, confidential information of another receiver can be calculated. Also, it is not possible to possess a key in common with only receivers which belong to any set of receivers.

SUMMARY OF THE INVENTION

Therefore, a principal object of the present invention is to provide a key distribution method and system for secure broadcast communication having the following features:

(1) receivers possess individual confidential key information to share a data enciphered key between the receivers;

(2) even in the case where the number of receivers is large, it is possible to reduce the length of key distribution data;

(3) even if receivers club their confidential information in conspiracy with each other, it is difficult to calculate key information of another receiver and confidential information of a key generator; and (4) it is possible to possess the data enciphered key in common with only receivers which belong to any set of receivers.

To that end, a key generator generates a finite set S including a plurality of confidential information of the key generator and a finite set P including public information of the key generator, generates confidential key information $s(x)$ of a receiver $\underline{x}$ from elements of a subset $S_x$ of the confidential information S on a space determined by a subset $V_x$ of the set S or P, and distributes the key information $s(x)$ to the receiver $\underline{x}$. A sender performs an operation of adding random numbers to elements in the public information corresponding to the elements of the set S and makes the multi-address transmission of a set R(P) including the elements which result from the operation. The receiver $\underline{x}$ selects a set R(P, x) of elements corresponding to $S_x$ from R(P) to calculate a common key between the sender and the receiver from each element of R(P, x) and the confidential key information $s(x)$. The common key corresponds to a data enciphered key.

According to a method for possessing a key in common with only receivers which belong to any set of receivers (in this case, a broadcasting station is a key generator and a sender), the broadcasting station generates confidential key information $s(x)$ of a receiver $\underline{x}$ from a subset $S_x$ of a finite set S including a plurality of elements and distributes the key information $s(x)$ to the receiver $\underline{x}$. The broadcasting station performs an operation of adding an arbitrarily selected random number to each element of a set P including values corresponding to the elements of the set S and makes the multi-address transmission of a set R(P) including the elements which result from the operation. The broadcasting station further transmits to only the limited receiver a value $t(x)$ characteristic of the receiver $\underline{x}$ which corresponds to the confidential key information $s(x)$ of the receiver $\underline{x}$. The receiver $\underline{x}$ selects a set R(P, x) of elements corresponding to $S_x$ from R(P) to calculate a common key between the broadcasting station and the receiver from the elements of R(P, x), the key information $s(x)$ and the value $t(x)$ of the receiver $\underline{x}$.

In the following, mention will be made of a specific realizing example of a method in which the length of key distribution data is short even in the case of a large number of receivers and the security against the conspiracy attack of receivers is improved.

As a preparatory process, a key generator generates $P, Q$: prime number $e_i \in Z, 0 < e_i < L = lcm(P-1, Q-1) (1 \leq i \leq m)$ as confidential information of the key generator and generates $N = PQ$ $g_i \in Z, 0 < g_i < N (1 \leq j \leq n)$ $u_{ij} = g_i^{e_i} \bmod N \quad (1 \leq i \leq m, 1 \leq j \leq n)$ $n = kl, k, l(>0) \in Z$ as public information of the key generator.

Further, the key generator calculates $S_{x, (\pi, \sigma)} = (S_{x,\pi_1(1)}, \ldots, S_{x,\pi_1(h)}, \ldots, S_{x,\pi_l(1)}, \ldots, S_{x, \pi_l(h)})$ satisfying $$\sum_{j=1}^{h} S_{x,\pi_i(j)} e_{\pi_i(j)} \equiv 1 (\bmod L_{\sigma_i}) \quad (1 \leq i \leq l)$$

for $\pi = (\pi_1, \ldots, \pi_l) \in R_{k, n}$, $\sigma = (\sigma_1, \ldots, \sigma_l) \in S_{k, n}$ and distributes $S_{x, (\pi, \sigma)}$ as key information of a receiver $\underline{x}$. Therein, $$L_{\sigma i} = ord_N \left( \prod_{j=1}^{k} g_{\sigma_i(j)} \right) \quad (1 \leq i \leq l).$$

Also, when $\sigma = (\sigma_1, \ldots, \sigma_l)$, $\sigma' = (\sigma_1, \ldots, \sigma_l) \in S'_{k, n}$ for set $R_{k, n} = \{\pi = (\pi_1, \ldots, \pi_l) | \text{one-to-one map } \pi_i: \{1, 2, \ldots, h\} \to (1, 2, \ldots, m\} (1 \leq i \leq l, 1 \leq h \leq m)\}$, set $S'_{k,n} = \{\sigma = (\sigma_1, \ldots, \sigma_l) | \text{one-to-one map } \sigma_1: A = \{1, 2, \ldots, k\} \to B = \{1, 2, \ldots, n\} (1 \leq i \leq l), \sigma_1(A) \cup \ldots \cup \sigma_l(A) = B\}$, a relation $$\sigma \sim \sigma' \overset{def}{\Longleftrightarrow} \sigma_i(A) = \sigma'_{\tau(i)}(A)(1 \leq i \leq l)$$

is defined in regard to a proper permutation $\tau$ on a set $\{1, 2, \ldots, l\}$. At this time, "~" represents an equivalent relation on $S'_{k,n}$ and $S_{k,n}$ is $S_{k,n} = S'_{k,n}/\sim$.

As a key distribution process, (1) a sender randomly selects an integer $\underline{r}$ to calculate $y_{ij} = u_{ij}^r \bmod N (1 \leq i \leq m; 1 \leq j \leq n)$ from the public information with the object of sharing a common key K $$K = \prod_{i=1}^{n} g_i^r \bmod N$$

and makes the multi-address transmission of $y_{ij}$.

(2) The receiver $\underline{x}$ calculates the common key K in accordance with $$K = \prod_{i=1}^{l} \prod_{p=1}^{h} \prod_{q=1}^{k} y_{\pi_i(p)\sigma_i(q)}^{S_{x,\pi_i(p)}} \bmod N$$

wherein Z represents a set of the whole of integers, lcm(a,b) represents the lowest common multiple of integers $\underline{a}$ and $\underline{b}$, and the least positive integer $\underline{x}$ satisfying $g^x \equiv 1 (\bmod N)$ for an integer N is represented by $ord_N(g)$.

According to the key distribution method of the present invention, the length of key distribution data can be reduced even in the case where the number of receivers is large. Also, even if unfair receivers club their confidential information, it is difficult to perform irregular practices. Therefore, the data distribution can be performed with a high efficiency and a high security.

BRIEF DESCRIPTION OF THE DRAWINGS

FIG. 11 is a diagram showing the basic scheme of reduction in key distribution data amount in the embodiments of the present invention.

DESCRIPTION OF THE PREFERRED EMBODIMENTS

FIG. 11 is a diagram showing the basic scheme of reduction in key distribution data amount in the present invention.

According to FIG. 11, a key generator extracts k information from $m$ confidential information $a_1, a_2, \ldots, a_m$ and generates confidential key information of a receiver from the extracted information. At this time, it is possible to obtain combinations the number of which is efficiently large as compared with the value of $m$. For example, when $(m, k)=(30, 15)$, the keys of one hundred and fifty million of receivers can be generated.

The key generator opens public information $b_1, b_2, \ldots, b_m$ corresponding to the confidential information $a_1, a_2, \ldots, a_m$ to the public. A sender selects random numbers $r$ and transmits information $c_1, c_2, \ldots, c_m$ obtained by applying the random numbers to the public information $b_1, b_2, \ldots, b_m$.

A receiver selects the same combination as that at the time of generation of the confidential information of the receiver from the information $c_1, c_2, \ldots, c_m$ to perform the calculation of a common key by use of the confidential information of the receiver.

Thereby, the mere transmission of $m$ data makes it possible to possess the key in common with receivers the number of which is not larger than $m!/(m-k)!k!$.

[Description of Symbols]

Prior to the description of embodiments of the present invention, explanation will be made of some symbols used in the description.

Z represents a set of the whole of integers, and lcm(a,b) represents the lowest common multiple of integers $a$ and $b$. Also, $\text{ord}_p(g)=m$ for a prime number $p$ and a positive integer $g$ means that the least integer $x>0$ satisfying $g^x \equiv 1 \pmod{p}$ is $m$, and $\min\{a_1, a_2, \ldots, a_n\}$ represents the least value in $a_1, a_2, \ldots, a_n$ ($a_i \in Z$).

(First Embodiment)

In a first embodiment, description will be made of a method in which a sender and a plurality of receivers share a common key information in order to perform a secure broadcast communication.

Figure 1:
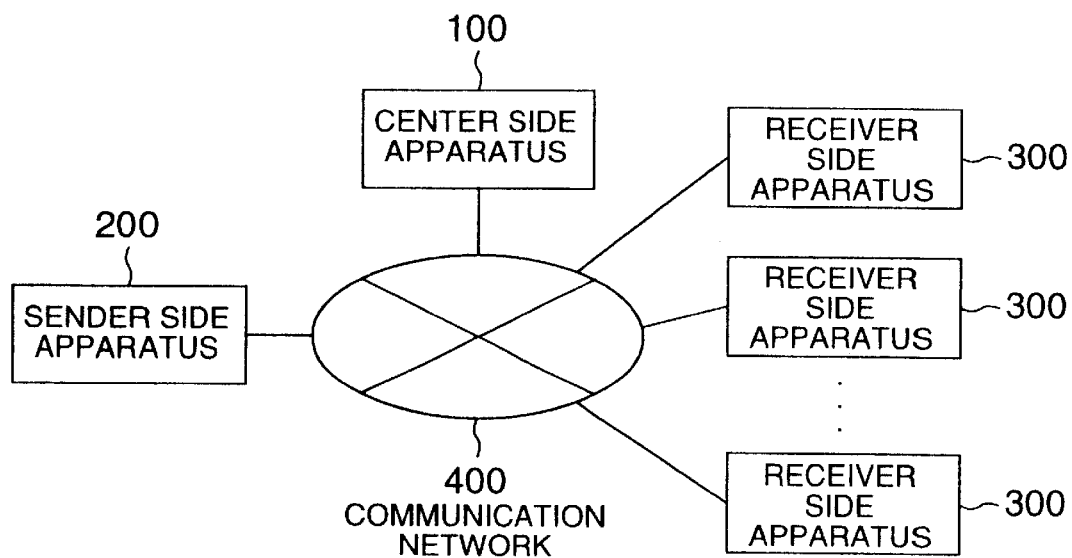
FIG. 1 is a diagram showing the construction of a system in first and second embodiments of the present invention.

FIG. 1 is a diagram showing the construction of a system in the present embodiment. This system includes a center side apparatus 100, a sender side apparatus 200 and receiver side apparatuses 300.

Figure 2:
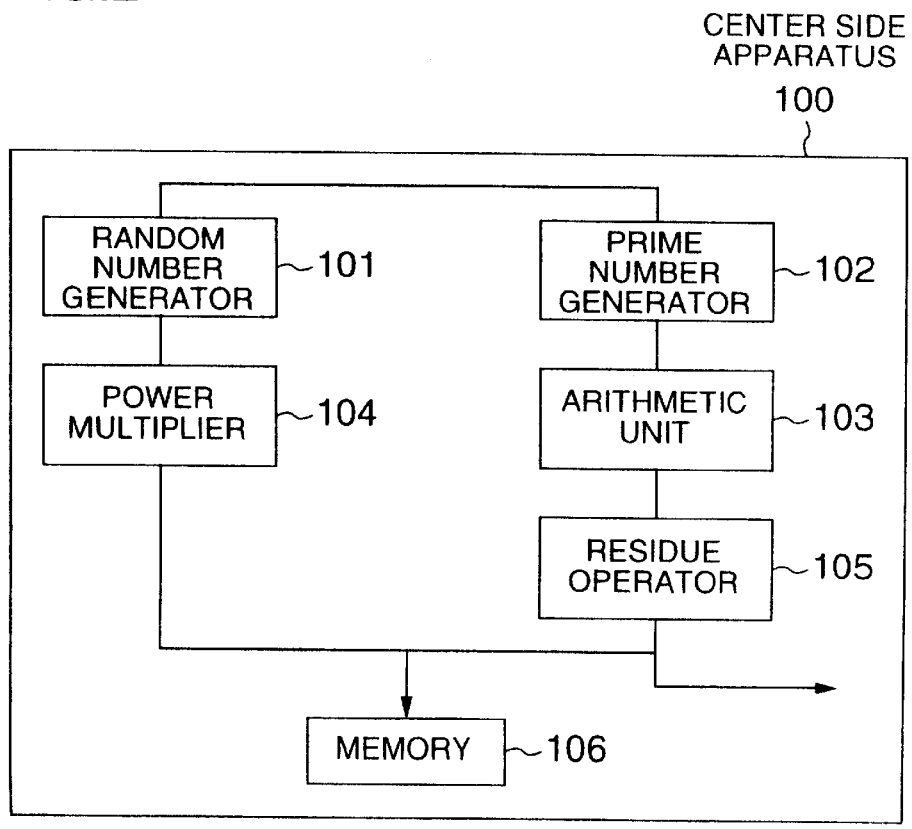
FIG. 2 is a diagram showing the internal construction of a center side apparatus in the first and second embodiments of the present invention.

FIG. 2 shows the internal construction of the center side apparatus 100. The center side apparatus 100 is provided with a random number generator 101, a prime number generator 102, an arithmetic unit 103, a power multiplier 104, a residue operator 105 and a memory 106.

Figure 3:
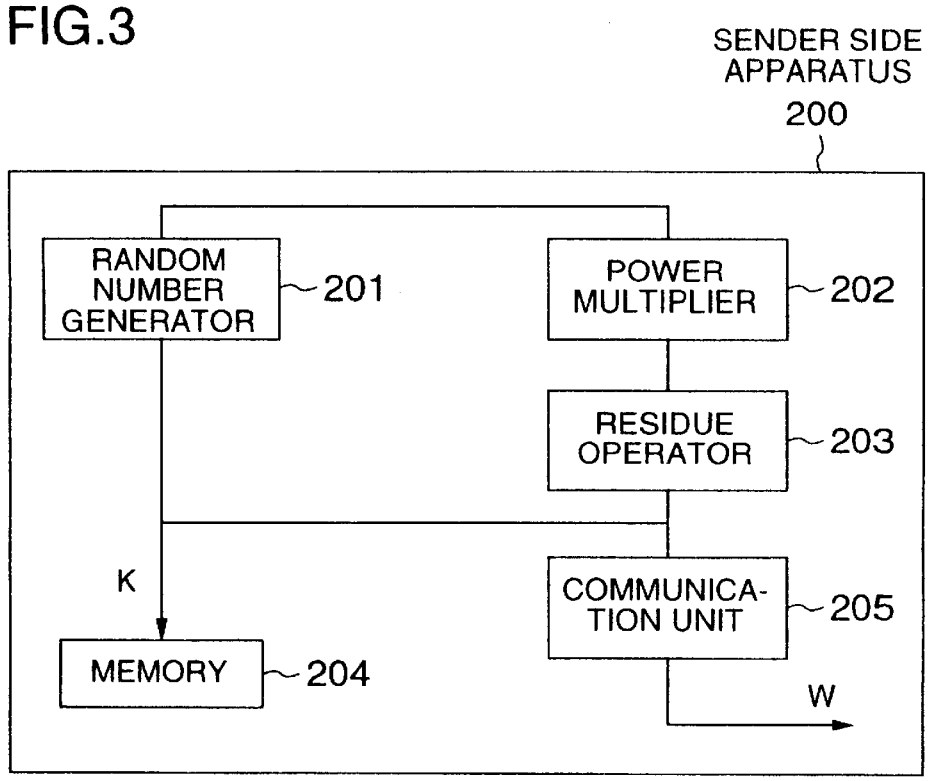
FIG. 3 is a diagram showing the internal construction of a sender side apparatus in the first and second embodiments of the present invention.

FIG. 3 shows the internal construction of the sender side apparatus 200. The sender side apparatus 200 is provided with a random number generator 201, a power multiplier 202, a residue operator 203, a memory 204 and a communication unit 205.

Figure 4:
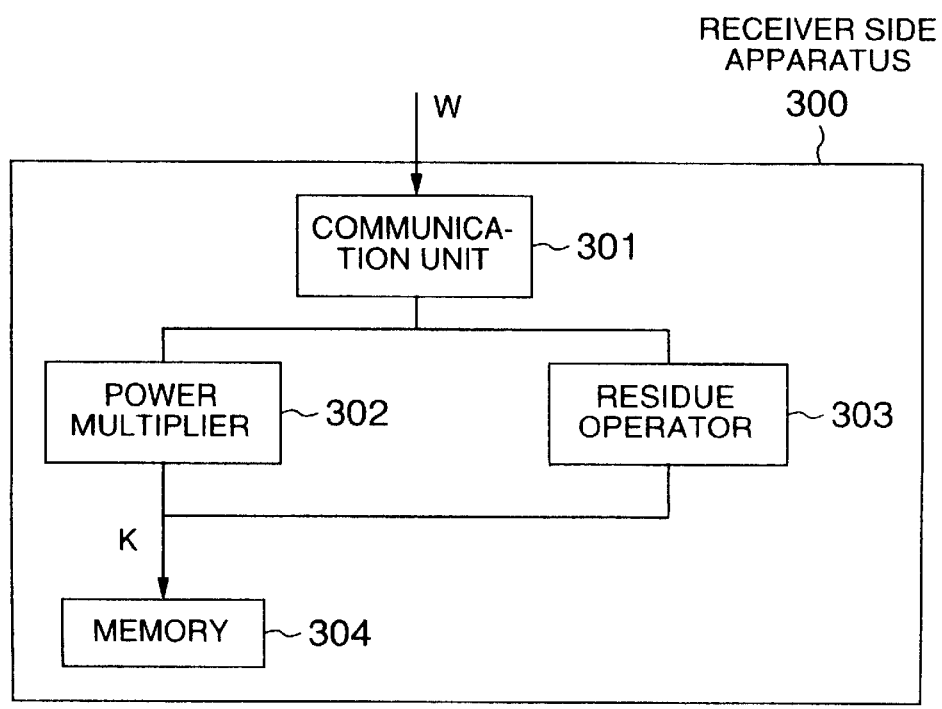
FIG. 4 is a diagram showing the internal construction of a receiver side apparatus in the first and second embodiments of the present invention.

FIG. 4 shows the internal construction of the receiver side apparatus 300. The receiver side apparatus 300 is provided with a communication unit 301, a power multiplier 302, a residue operator 303 and a memory 304.

1. Preparatory Process

A reliable center generates the following information by use of the random number generator 101, the prime number generator 102, the arithmetic unit 103, the power multiplier 104 and the residue operator 105 in the center side apparatus 100 shown in FIG. 2.

Confidential information:

$P_i, Q_i$:prime number $(1 \leq i \leq m)$ $L_i = lcm(\text{ord}_{P_i}(g), \text{ord}_{Q_i}(g))$ $(1 \leq i \leq m)$ $e_i \in Z, 0 < e_i < L = lcm(L_1, L_2, \ldots, L_m)(1 \leq i \leq n)$ Public information:

$N_i = P_i Q_i (1 \leq i \leq m)$ $g \in Z, 0 < g < N$ $$N = \prod_{i=1}^{m} N_i$$

$v_i = g^{h_i(e_1, \ldots, e_n)} \bmod N$ $(1 \leq i \leq M)$.

The center opens only the public information to the public. The confidential information is stored into the memory 106.

Further, the center calculates $S_{x, \tau} = (S_{x,\tau(1)}, S_{x,\tau(2)}, \ldots, S_{x,\tau(d)})$ satisfying $$\sum_{i=1}^{d} S_{x,\tau(i)} h_{\tau(i)}(e_1, \ldots, e_n) \equiv 1 (\bmod L_{\sigma_x})$$

for $\tau_x \in S$ and $\tau \in T$ by use of the arithmetic unit 103 and the residue operator 105 in the center side apparatus 100 and distributes $S_{x, \tau}$ as key information of a receiver $x$. Therein, $L_\tau = lcm(L_{\tau(1)}, L_{\tau(2)}, \ldots, L_{\tau(k)})$.

Also, $h_i(X_1, \ldots, X_n)$ $(1 \leq i \leq M)$ represents a monomial of $X_1, \ldots, X_n$ on Z. For set S'={f|one-to-one map f:

$A = \{1, 2, \ldots, k\} \to B = \{1, 2, \ldots, m\}, m > k\}, \tau_1, \tau_2 \in S'$, a relation "~" on S' is defined as $$\sigma_1 \sim \sigma_2 \overset{def}{\Longleftrightarrow} \sigma_1(A) = \sigma_2(A),$$

and a quotient set of S' concerning "~" is defined as S. Further, set $T = \{f | \text{one-to-one map } f: A = \{1, 2, \ldots, d\} \to B = (1, 2, \ldots, M\}, M \geq d\}$.

Here, $S_{x,\tau}$ is generated so as to satisfy the condition of a secure key that $\pi_x \neq g$ for $$r_x = g^{\sum_{i=1}^{d} s_{x,\tau(i)} h_{\tau(i)}(e_1, \ldots, e_n)} \bmod N.$$

2. Key Distribution Process (1) A sender randomly selects an integer r by use of the random number generator 201 in the sender side apparatus 200 shown in FIG. 3 to calculate a common key K by use of the power multiplier 202 and the residue operator 203 so that $0 < K = g^r \bmod N$, $$\pi_x^r \bmod N < \min\left\{ N_\sigma = \prod_{i=1}^{k} N_{\sigma(i)} \middle| \sigma \in S \right\}$$

is satisfied. K is stored into the memory 204. Further, the sender calculates $z_i = v_i^r \bmod N (1 \leq i \leq M)$ with the object of possessing the key K in common with the receiver and makes the multi-address transmission of data W obtained by multiplexing $z_i$ ($1 \leq i \leq M$) by use of the communication unit 205 (in accordance with, for example, the multiplexing method using the Chinese reminder theorem mentioned in "BACKGROUND OF THE INVENTION"). The transmission is made through a communication network 400.

(2) The receiver side apparatus 300 (see FIG. 4) of the receiver $\underline{x}$ demultiplexes $Z_{\tau(i)}$ ($1 \leq i \leq d$) from the transmit data w by use of the communication unit 301 and uses the power multiplier 302 and the residue operator 303 to calculate the common key K from $S_{x,\tau}$ and N in the memory 304 in accordance with $$K = \prod_{i=1}^{d} z_{\tau(i)}^{s_{x,\tau(i)}} \bmod N.$$

The calculated common key K is stored into the memory 304.

According to the present embodiment, a space for generating the key information of a receiver is changed for each receiver. (The space is determined by the value of $L_{\sigma x}$.) Therefore, the security against the conspiracy attack of receivers is improved as compared with that in the system disclosed by Mambo et al., "Efficient Secure Broadcast Communication Systems", IEICE Technical Report, ISEC93-34 (October 1993) mentioned in "BACKGROUND OF THE INVENTION".

(Second Embodiment)

In a second embodiment, description will be made of a method in which a sender and a plurality of receivers share a common key information in order to perform a secure broadcast communication.

The construction of a system is the same as that shown in FIG. 1 in conjunction with the first embodiment.

1. Preparatory Process

A reliable center generates the following information by use of the random number generator 101, the prime number generator 102, the arithmetic unit 103, the power multiplier 104 and the residue operator 105 in the center side apparatus 100 shown in FIG. 2.

Confidential information:

$P_i, Q_i$:prime number ($1 \leq i \leq m$)

$e_i \in Z$, $0 < e_i < L = lcm(L_1, L_2, \ldots, L_m)$ ($1 \leq i \leq n$)

Public information:

$N_i = P_i Q_i$ ($1 \leq i \leq m$)

$g_i \in Z$, $0 < g_i < M$ ($1 \leq i \leq M$)

$$N = \prod_{i=1}^{m} N_i$$

$V = (v_{ij})$, $v_{ij} = g_i^{h_j(e_1, \ldots, e_n)} \bmod N$ ($1 \leq i, j \leq M$).

The center opens only the public information to the public. The confidential information is stored into the memory 106.

Further, the center calculates $S_{\sigma_x} = ((S_{\sigma_{x,1}(1)}, S_{\sigma_{x,1}(2)}, \ldots, S_{\sigma_{x,1}(k)}), \ldots, (S_{\sigma_{x,a}(1)}, S_{\sigma_{x,a}(2)}, \ldots, S_{\sigma_{x,a}(k)}))$ satisfying $$\sum_{i=1}^{k} s_{\sigma_{x,j}(i)} h_{\sigma_{x,j}(i)}(e_1, \ldots, e_n) \equiv 1 (\bmod L_{\sigma'_{x,j}}), \quad (1 \leq j \leq a)$$

for $\sigma_x = (\sigma_{x,1}, \ldots, \sigma_{x,a}) \in S$, $\sigma'_x = (\sigma'_{x,1}, \ldots, \sigma'_{x,a}) \in T$ by use of the arithmetic unit 103 and the residue operator 105 in the center side apparatus 100 and distributes $S_{\sigma_x}$ and $$N_{\sigma'_{x,i}} = \prod_{j=1}^{d} N_{\sigma_{x,i}(j)}, \quad (i = 1, \ldots, a)$$

as key information of a receiver $\underline{x}$. Therein, $$L_{\sigma'_{x,i}} = ord_{N_{\sigma'_{x,i}}}\left(\sum_{j=1}^{k} g_{\sigma_{x,i}(j)}\right), \quad (i = 1, \ldots, a, a: \text{positive integer}).$$

Also, $h_i(X_1, \ldots, X_n)$ ($1 \leq i \leq m$) represents a monomial of $X_1, \ldots, X_n$ on Z. For set $S'(M) = \{\sigma = (\sigma_1, \ldots, \sigma_a) | \text{one-to-one map } \sigma_i: A = \{1, 2, \ldots, k\} \to B = \{1, 2, \ldots, M\}$ ($i = 1, \ldots, a$), $\sigma_1(A) \cup \ldots \cup \sigma_a(A) = B$, $M = ak\}$, $\sigma = (\sigma_1, \ldots, \sigma_a)$, $\sigma' = (\sigma'_1, \ldots, \sigma'_a) \in S'(M)$, a relation $$\sigma \sim \sigma' \overset{def}{\Longleftrightarrow} \{\sigma_1(A), \ldots, \sigma_a(A)\} = \{\sigma'_1(A), \ldots, \sigma'_a(A)\}$$

is defined and a quotient set of S'(M) concerning "~" is defined as S. Further, a quotient set of m=ad, S'(m) concerning "~" is defined as T.

2. Key Distribution Process (1) A sender randomly selects an integer r by use of the random number generator 201 in the sender side apparatus 200 shown in FIG. 3 to calculate a common key K $$K = \left(\prod_{i=1}^{M} g_i\right)^r \bmod N,$$

$$0 < \left(\prod_{j=1}^{k} g_{\sigma'_{x,i}(j)}\right)^r \bmod N \leq \min\{N_{\sigma'_{x,i}} | \forall x, \sigma'_x\}$$

$$i = (1, \ldots, a)$$

by use of the power multiplier 202 and the residue operator 203 and stores K into the memory 204. Further, the sender calculates $$W=(w_{ij}), \ w_{ij}=v_{ij}{}^r \bmod N (1 \leq i,j \leq M)$$

with the object of possessing the key K in common with the receiver and makes the multi-address transmission of the data W through the communication network 400 by use of the communication unit 205.

(2) The receiver side apparatus 300 (see FIG. 4) of the receiver $\underline{x}$, from the transmit data W received by the communication device 301 and by use of the power multiplier 302 and the residue operator 303, calculates the common key K from $s_{\sigma_x}$ and N in the memory 304 in accordance with $$K = \prod_{i=1}^{a} k_i \bmod N$$

wherein $$K_t = \prod_{i=1}^{k} \left(\prod_{j=1}^{k} w_{\sigma_{x,t}(j)\sigma_{x,t}(i)}\right)^{s_{\sigma_{x,t}(i)}} \bmod N_{\sigma'_{x,t}}$$

$$(1 \leq t \leq a).$$

The calculated common key K is stored into the memory 304.

In the second embodiment, one condition for generation of a secure key may be $$\sum_{i=1}^{k} s_{\sigma_{x,j}(i)} h_{\sigma_{x,j}(i)}(e_1, \ldots, e_n) \equiv 1 (\bmod \tilde{L}_{\sigma'_{x,j}})$$

$$\tilde{L}_{\sigma'_{x,j}} = lcm\left(ord_{N_{\sigma'_{x,j}}}\left(g_{\sigma_{x,j}(1)}\right), \ldots, ord_{N_{\sigma'_{x,j}}}\left(g_{\sigma_{x,j}(k)}\right)\right)$$

$$(j = 1, \ldots, a)$$

According to the second embodiment, a space for generating the key information of a receiver is changed for each receiver. (This space is determined by the value of $L_{\sigma'_{x,1}}, \ldots L_{\sigma'_{x,a}}$) Therefore, the security against the conspiracy attack of receivers is improved as compared with that in the system disclosed by Mambo et al., "Efficient Secure Broadcast Communication Systems", IEICE Technical Report, ISEC93-34 (October 1993) mentioned in "BACKGROUND OF THE INVENTION".

(Third Embodiment)

The present embodiment corresponds to the case where a limited secure broadcast communication method based on the key distribution method according to the first embodiment is applied to an information distribution service system using a satellite. Namely, a broadcast station makes the secure broadcast communication of information (including onerous data) such as multimedia information to receivers by use of a satellite and only receivers entitled to looking and listening (or receivers under agreement for the payment of counter values) can decipher transmit data.

Figure 5:
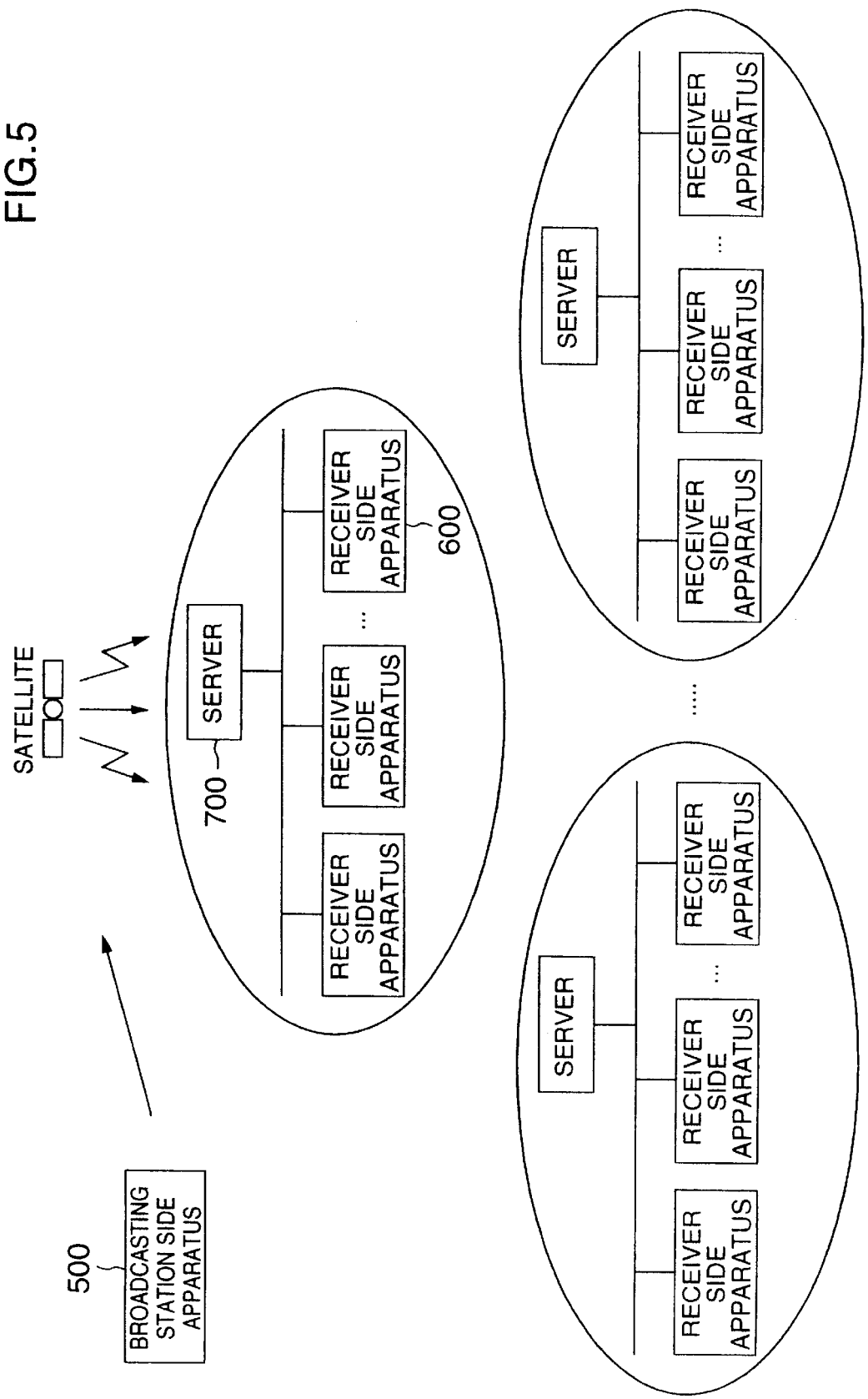
FIG. 5 is a diagram showing the construction of a system in third, fourth and eighth embodiments of the present invention.

FIG. 5 is a diagram showing the construction of a system in the present embodiment. This system includes a broadcasting station side apparatus 500, receiver side apparatuses 600 and servers 700.

Figure 6:
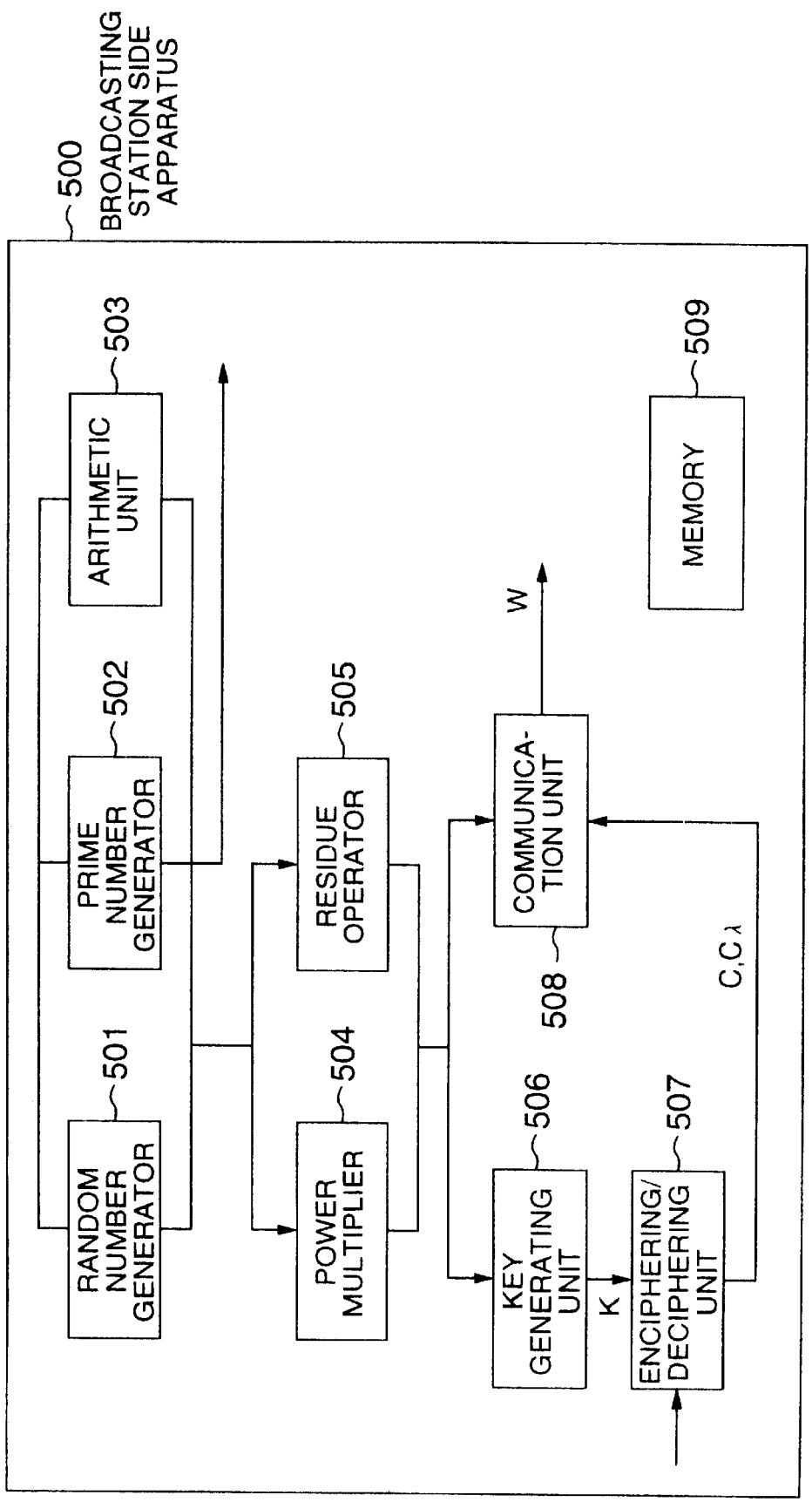
FIG. 6 is a diagram showing the internal construction of a sender side apparatus in the third, fourth and eighth embodiments of the present invention.

FIG. 6 shows the internal construction of the broadcasting station side apparatus 500. The broadcasting station side apparatus 500 is provided with a random number generator 501, a prime number generator 502, an arithmetic unit 503, a power multiplier 504, a residue operator 505, a key generating unit 506, an enciphering/deciphering unit 507, a communication unit 508 and a memory 509.

Figure 7:
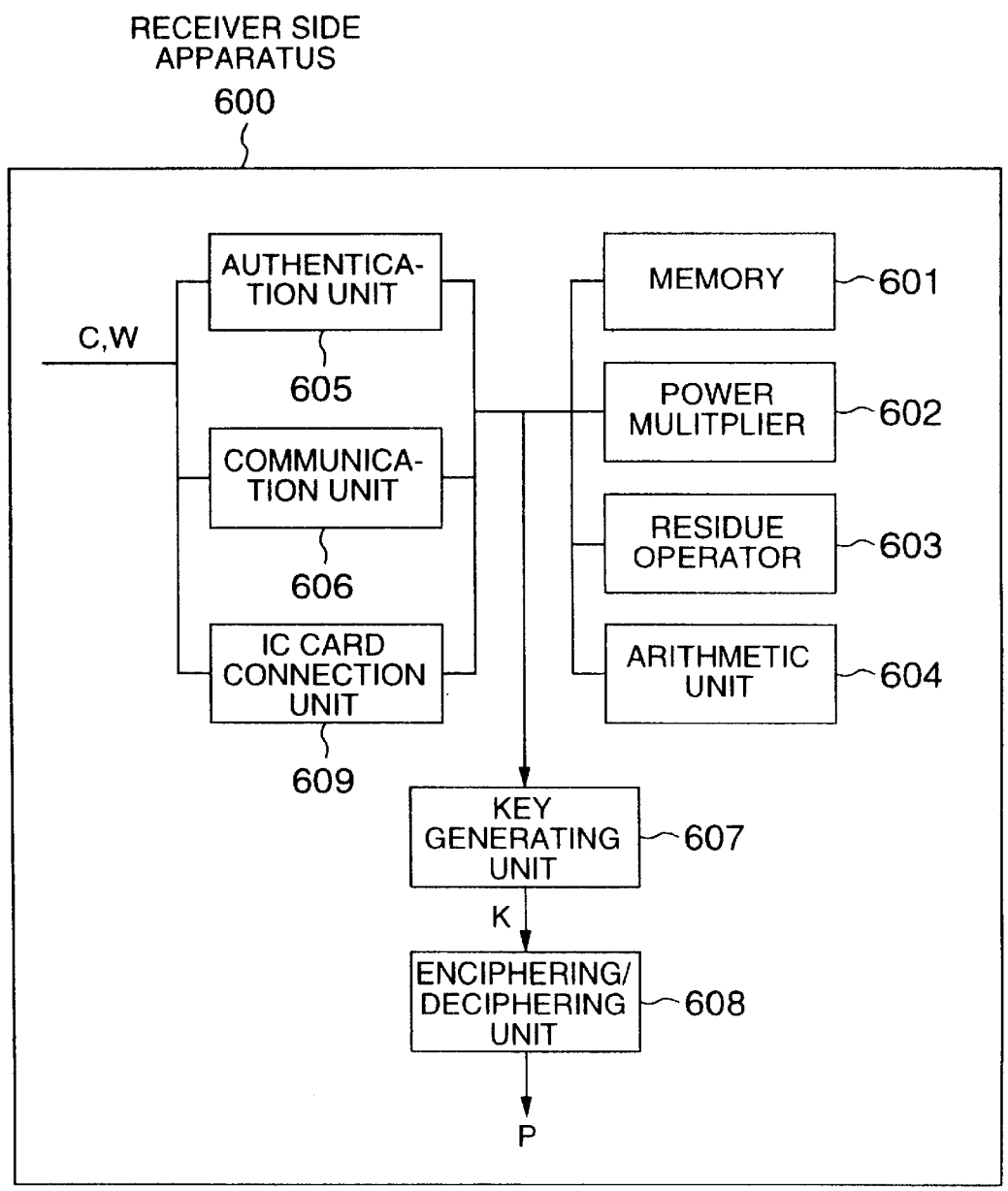
FIG. 7 is a diagram showing the internal construction of a receiver side apparatus in the third, fourth and eighth embodiments of the present invention.

FIG. 7 shows the internal construction of the receiver side apparatus 600. The receiver side apparatus 600 is provided with a memory 601, a power multiplier 602, a residue operator 603, an arithmetic unit 604, an authentication unit 605, a communication unit 606, a key generating unit 607, an enciphering/deciphering unit 608 and an IC card connection unit 609.

Figure 8:
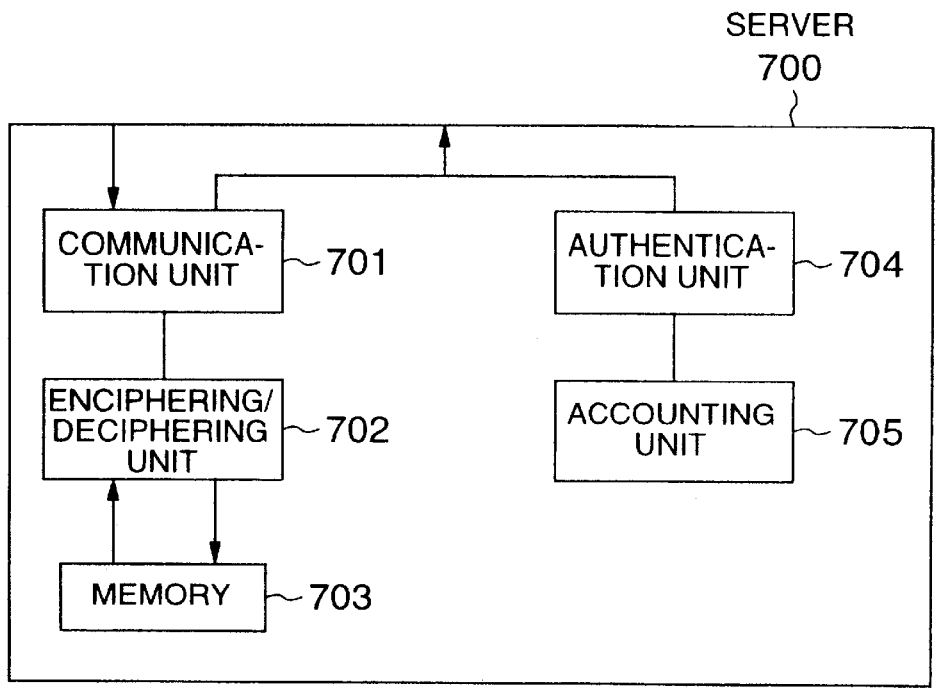
FIG. 8 is a diagram showing the internal construction of a server in the third, fourth and eighth embodiments of the present invention.

FIG. 8 shows the internal construction of the server 700. The server 700 is provided with a communication unit 701, an enciphering/deciphering unit 702, a memory 703, an authentication unit 704 and an accounting unit 705.

Figure 9:
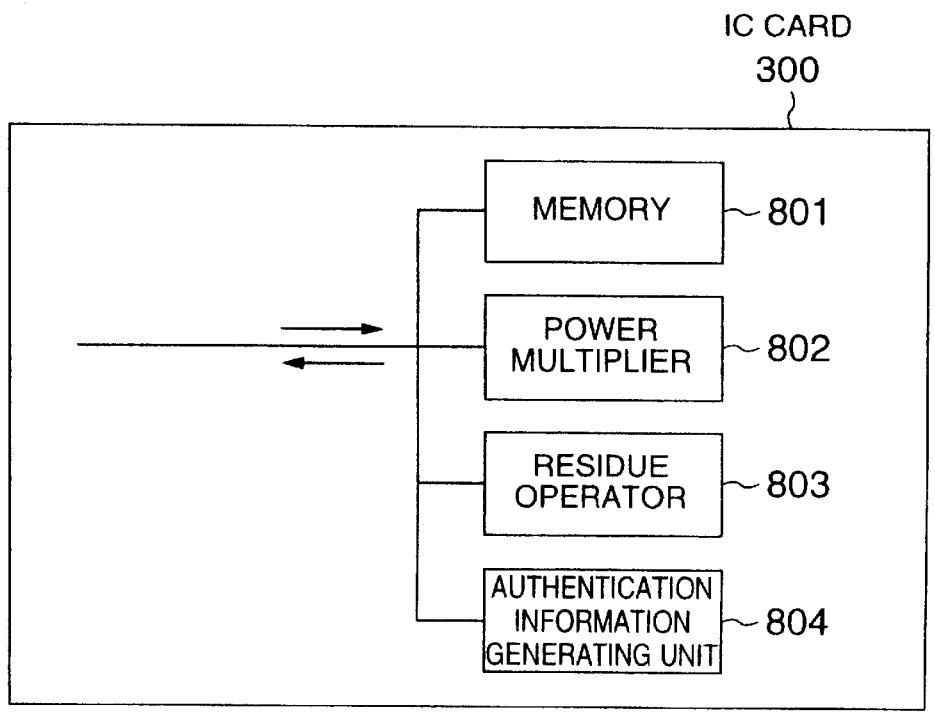
FIG. 9 is a diagram showing the internal construction of an IC card in sixth and seventh embodiments of the present invention.

FIG. 9 shows the internal construction of an IC card 800 possessed by a receiver. The IC card 800 is provided with a memory 801, a power multiplier 802, a residue operator 803 and an authentication information generating unit 804.

Figure 10:
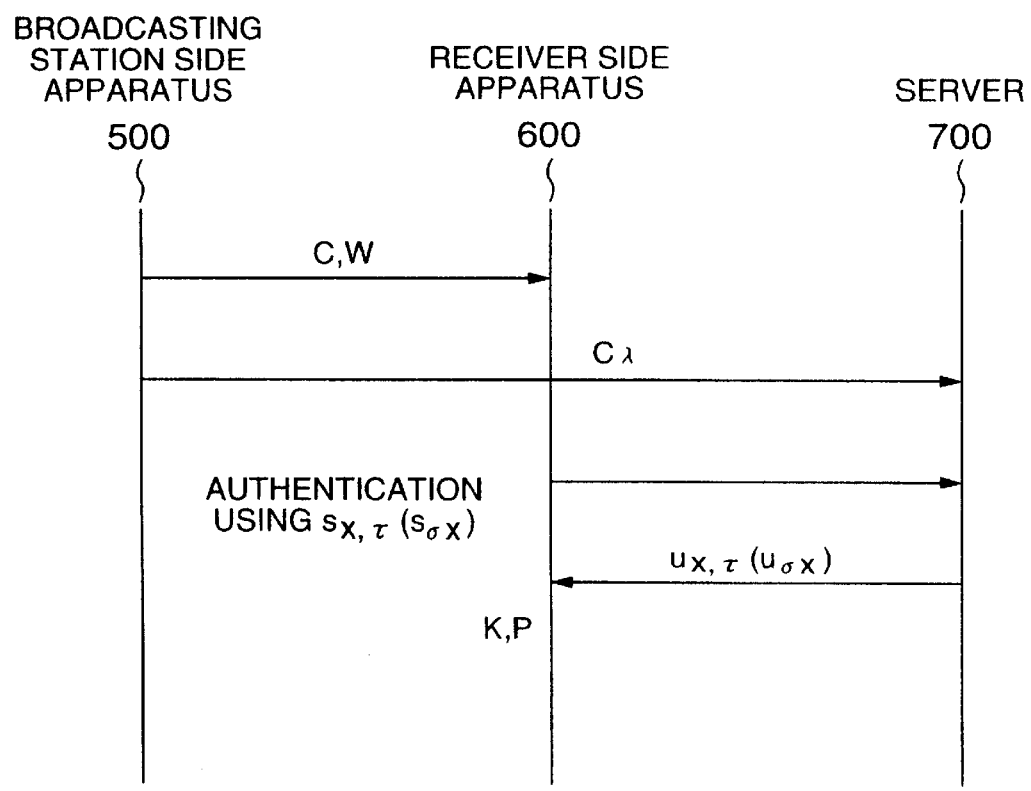
FIG. 10 is a diagram showing the outline of the third and fourth embodiments of the present invention.

FIG. 10 is a diagram showing the outline of transfer of information between the broadcasting station side apparatus 500, the receiver side apparatus 600 and the server 700.

A set R of receivers is $R = U_{\lambda \in \Lambda} R_{80}$ for a family $\{R_\lambda\}_{\lambda \in \Lambda}$ of subsets and a server $S_\lambda$ is provided corresponding to each subset $R_\lambda$.

1. Preparatory Process

A broadcasting station generates the following information by use of the random number generator 501, the prime number generator 502, the arithmetic unit 503, the power multiplier 504 and the residue operator 505 in the broadcasting station side apparatus 500 and stores in the memory 509 (see FIG. 6).

Confidential information:

$P_i, Q_i$: prime number ($1 \leq i \leq m$)

$L_i = lcm \ (ord_{p_i}(g), ord_{Q_i}(g)) \ (1 \leq i \leq m)$ $e_i \in Z, \ 0 < e_i < L = lcm \ (L_1, L_2, \ldots, L_m)(1 \leq i \leq n)$ Public information:

$N_i = P_i Q_i \ (1 \leq i \leq m)$ $g \in Z, \ 0 < g < N$ $$N = \prod_{i=1}^{m} N_i$$

$v_i = g^{h_i(e_1, \ldots, e_n)} \bmod N \ (1 \leq i \leq M).$

The broadcasting station opens only the public information to the public.

Further, the broadcasting station generates $S_{x,\tau} = (S_{x,\tau(1)}, S_{x,\tau(2)}, \ldots S_{x,\tau(d)}) \ (S_{x,\tau(i)} \in Z, \ 0 < S_{x,\tau(i)} < L, \ \tau \in T)$ by use of the random number generator 501 and distributes $s_{x,\tau}$ as key information of a receiver $\underline{x}$. Therein, $h_i \ (X_1, \ldots, X_n)$ ($1 \leq i \leq M$) represents a monomial of $X_1, \ldots, X_n$ on Z. Also, set T={f|one-to-one map f: A={1, 2, \ldots, d}→B={1, 2, \ldots, M}, M \geq d}.

The broadcasting station generates a random number r' ($0 \leq r' \leq L$) for $\sigma_x \in S$ by use of the random number generator 501 in the broadcasting station side apparatus 500 and calculates $U_{x,\sigma}=(U_{x,\tau(1)}, U_{x,\tau(2)}, \ldots, U_{x,\tau(d)})$ satisfying $$\sum_{i=1}^{d} u_{x,\tau(i)} s_{x,\tau(i)} h_{\tau(i)}(e_1, \ldots, e_n) \equiv r'(\mathrm{mod} L_{\sigma_x})$$

by use of the arithmetic unit 503 and the residue operator 505, wherein $$L\sigma = lcm(L_{\sigma(1)}, L_{\sigma(2)}, \ldots, L_{\sigma(k)}) \ (\sigma \in S).$$

Also, for set S'={f|one-to-one map f: A={1, 2, ..., k}→B={1, 2, ..., m}, m≧K}, $\sigma_1, \sigma_2 \in S'$, a relation "~" on S' is defined as $$\sigma_1 \sim \sigma_2 \overset{def}{\Longleftrightarrow} \sigma_1(A) = \sigma_2(A),$$

and a quotient set of S' concerning "~" is defined as S.

Here, $s_{x,\tau}$ is generated so as to satisfy the condition of a secure key that $\pi_x \neq g$ for $$p_x = g^{\sum_{i=1}^{d} s_{x,\tau(i)} h_{\tau(i)}(e_1, \ldots, e_n)} \mathrm{mod} N.$$

2. Enciphering/Deciphering Process (1) The broadcasting station randomly selects an integer $r(0 \leq r \leq L)$ by use of the random number generator 501 in the broadcasting station side apparatus 500 so that $$0 < g^{rr'} \mathrm{mod} \ N,$$

$$\pi_x^{rr'} \mathrm{mod} N < \min \left\{ N_\sigma = \prod_{i=1}^{k} N_{\sigma(i)} \middle| \sigma \in S \right\}$$

is satisfied, and generates a data enciphered key K=f($g^{rr'}$ mod N) by use of the power multiplier 504, the residue operator 505 and the key generating unit 506. Further, the broadcasting station calculates $$z_i = v_i^r \bmod N \ (1 \leq i \leq M)$$

and makes the multi-address transmission of an enciphered sentence C=E(K:P) obtained by enciphering data P by the key K by use of the enciphering/deciphering unit 507 and data W obtained by multiplexing $z_i (1 \leq i \leq M)$ by use of the communication unit 508 (in accordance with, for example, the multiplexing method using the Chinese reminder theorem mentioned in "BACKGROUND OF THE INVENTION"). Herein, f is a key generation function of a confidential key enciphering system opened to the public. Further, the broadcasting station generates $$V_\lambda = \{ u_{x,\tau} = (u_{x,\tau(1)}, \ldots, u_{x,\tau(d)}) \ | x \in R_\lambda \}$$

for each $\lambda \in \Lambda$ by use of the arithmetic unit 503 and the residue operator 505 in the broadcasting station side apparatus 500, obtains an enciphered sentence $C_\lambda = E(K(S_\lambda): V_\lambda)$ by enciphering $V_\lambda$ by a key $K(S_\lambda)$ by use of the enciphering/deciphering unit 507 and transmits $C_\lambda$ to the server 700 ($S_\lambda$) by use of the communication unit 508. The key $K(S_\lambda)$ is shared between the broadcasting station and the server 700 ($S_\lambda$) beforehand.

(2) In order to see the data P, a receiver $\underline{x}$ uses the communication unit 606 in the receiver side apparatus 600 shown in FIG. 7 to make access to a server 700 in an area to which the receiver belongs. And, the receiver uses the authentication unit 605 in the receiver side apparatus 600 (and the server 700 uses the authentication unit 704) to make the authentication by demonstrating the possession of the confidential information $s_{x,\tau}$. If the authentication is materialized, the server 700 transmits $U_{x,\tau}=(U_{x,\tau(1)}, U_{x,\tau(2)}, \ldots, U_{x,\tau(k)})$ in the memory 703 to the receiver side apparatus 600 of the receiver $\underline{x}$ by use of the communication unit 701.

At this time, in the case where the data P is onerous, the server 700 performs a process for account to the receiver $\underline{x}$ by use of the accounting unit 705.

(3) The receiver side apparatus 600 of the receiver $\underline{x}$ calculates a data enciphered key K from $s_{x,\tau}$ in the memory 601 by use of the power multiplier 602, the residue operator 603 and the key generating unit 607 in accordance with $$K = \prod_{i=1}^{d} z_{\tau(i)}^{u_{x,\tau(i)} s_{x,\tau(i)}} \mathrm{mod} N$$

and deciphers the data P from the enciphered sentence by use of the enciphering/deciphering unit 608.

Also, a method for authentication by the receiver $\underline{x}$ for the server 700 in the step (2) of the above-mentioned enciphering/deciphering process can rely upon a known authentication system, so far as it is a method with which the authentication is not materialized if the receiver $\underline{x}$ does not know $s_{x,\tau}$.

In the following, a method using a signature as disclosed by RSA (R. L. Rivest, A. Shamir and L. Adleman, "A method for obtaining digital signatures and public key cryptosystems", Commun. of the ACM, Vol. 21, No. 2, pp. 120–126 (1987)) will be mentioned as an example of the method for authentication by the receiver $\underline{x}$ for the server 700.

The broadcasting station distributes ($y_x$, $n_x$) satisfying $$s'_x y_x \equiv 1 \ (mod \ lcm(p_x-1, q_x-1)),$$

$$n_x = p_x q_x \ (p_x, q_x: \text{prime number})$$

for each receiver $\underline{x}$ to a server 700 in an area to which the receiver belongs, wherein $s'_x = \pi(s_{x,\tau})$ for a function $\pi$ opened to the public.

(i) The receiver $\underline{x}$ uses the authentication unit 605 in the receiver side apparatus 600 to generate a signature $$sgn_x(h(W)) = h(W)^{s'_x} mox \ n_x$$

for h(W) (0<h(W)<$n_x$) by use of a confidential key $s'_x$, wherein W is the multi-address transmitted data and $\underline{h}$ is a one-way hash function which is public information. The generated signature is transmitted to the server 700 by use of the communication unit 606. The signature is transmitted together with a data name for which the looking and listening are desired.

(ii) The server 700 checks a relation of $$sgn_x(h(W))^{y_x} \equiv h(W) \ (mod \ n_x)$$

by use of the authentication unit 704 and transmits $u_{x,\tau}$ in the memory 703 to the receiver side apparatus 600 of the receiver $\underline{x}$ by use of the communication unit 701 if the relation is satisfied. At this time, in the case where the data desired by the receiver for the looking and listening is onerous, the server 700 performs a process for account to the receiver $\underline{x}$ by use of the accounting unit 705. Also, in the case where the receiver $\underline{x}$ possesses an IC card 800 having confidential information $s'_x$ and connects the IC card 800 to the IC card connection unit 609 in the receiver side apparatus 600 to obtain data from the broadcasting station, the calculation by the receiver using the confidential information $s'_x$ is performed using the authentication information generating unit 804 in the IC card 800 shown in FIG. 9. For instance, in the above example, the calculation of $sgn_x(W)$ is performed using the authentication information generating unit 804 in the IC card 800.

According to the present embodiment, the identification of a set of receivers sharing a key is made by distributing $u_{x,\tau}$ to only limited receivers. Thereby, the key distribution for a limited secure broadcast communication becomes possible.

(Fourth Embodiment)

The present embodiment corresponds to the case where a limited secure broadcast communication method based on the key distribution method according to the second embodiment is applied to an information distribution service system using a satellite. Namely, a broadcast station makes the secure broadcast communication of information (including onerous data) such as multimedia information to receivers by use of a satellite and only receivers entitled to looking and listening (or receivers under agreement for the payment of counter values) can decipher transmit data.

The construction of a system in the present embodiment is the same as that shown in FIG. 5 explained in conjunction with the third embodiment. FIGS. 6 to 10 are also applied to the present embodiment.

A set R of receivers is $R = U_{\lambda \in \Lambda} R_\lambda$ for a family $\{R_\lambda\}_{\lambda \in \Lambda}$ of subsets and a server $S_\lambda$ is provided corresponding to each subset $R_\lambda$.

1. Preparatory Process

A broadcasting station generates the following information by use of the random number generator 501, the prime number generator 502, the arithmetic unit 503, the power multiplier 504 and the residue operator 505 in the broadcasting station side apparatus 500 (see FIG. 6).

Confidential information:

$P_i, Q_i$: prime number $(1 \leq i \leq m)$ $e_i \in Z, 0 < e_i < L = lcm (L_1, L_2, \ldots, L_m)(1 \leq i \leq n)$ Public information:

$N_i = P_i Q_i \; (1 \leq i \leq m)$ $$N = \prod_{i=1}^{m} N_i$$

$V = (v_{ij}), v_{ij} = g_i^{h_j(e_1, \ldots, e_n)} \bmod N$ $(1 \leq i, j \leq M)$.

The broadcasting station opens only the public information to the public.

Further, the broadcasting station generates $S_{\sigma_x} = ((S_{\sigma_{x,1}(1)}, S_{\sigma_{x,1}(2)}, S_{\sigma_{x,1}(k)}), \ldots, (S_{\sigma_{x,a}(1)}, S_{\sigma_{x,a}(2)}, S_{\sigma_{x,a}(k)})) S_{\sigma_{x,a}(i)}, \ldots, S_{\sigma_{x,a}(i)}, \epsilon Z, 0 < S_{x,\tau(i)} < L, \sigma_x = (\sigma_{x,1}, \ldots, \sigma_{x,a}) \in S)$ by use of the random number generator 501 and distributes $s_{\sigma x}$ together with $$N_{\sigma'_{x,i}} = \prod_{j=1}^{d} N_{\sigma_{x,i(j)}}: (i-1, \ldots, a)$$

as key information of a receiver $\underline{x}$. Therein, $h_i(X_1, \ldots, X_n)$ $(1 \leq i \leq M)$ represents a monomial of $X_1, \ldots, X_n$ on Z. Also, for set $S'(M) = \{\sigma = (\sigma_1, \ldots, \sigma_a) | \text{one-to-one map}$ $\sigma_i: A = \{1, 2, \ldots, k\} \to B = \{1, 2, \ldots, M\}$ $(i=1, \ldots, a), \sigma_1(A)$ $U \ldots U \sigma_a(A) = B, M = ak\}, \sigma = (\sigma_1, \ldots, \sigma_a), \sigma' = (\sigma'_1, \ldots, \sigma'_a)$ $\in S'(M)$, a relation $$\sigma \sim \sigma' \stackrel{def}{\Longleftrightarrow} \{\sigma_1(A), \ldots, \sigma_a(A)\} = \{\sigma'_1(A), \ldots, \sigma'_a(A)\}$$

is defined and a quotient set of S'(M) concerning "$\sim$" is defined as S. Further, a quotient set of m=ad, S'(m) concerning "$\sim$" is defined as T.

The broadcasting station generates a random number $r'(0 \leq r' \leq L)$ for $\sigma_x = (\sigma_{x,1}, \ldots, \sigma_{x,a})) \in S, \sigma'_x = (\sigma'_{x,1}, \ldots, \sigma'_{x,a})$ $\in T$ by use of the random number generator 501 in the broadcasting station side apparatus 500 and calculates $u_{\sigma_x} = ((u_{\sigma_{x,1}(1)}, u_{\sigma_{x,1}(2)}, \ldots, u_{\sigma_{x,1}(k)}), \ldots, (u_{\sigma_{x,a}(1)}, u_{\sigma_{x,a}(2)}, \ldots, u_{\sigma_{x,a}(k)}))$ satisfying $$\sum_{i=1}^{k} u_{\sigma_{x,j}(i)} s_{\sigma_{x,j}(i)} h_{\sigma_{x,j}(i)}(e_1, \ldots, e_n) \equiv r' (\bmod L_{\sigma'_{x,j}})$$

$(1 \leq j \leq a)$ by use of the arithmetic unit 503 and the residue operator 505, wherein L satisfies (i=1, . . . , a).

$$L_{\sigma'_{x,i}} = ord_{N_{\sigma'_{x,i}}} \left( \prod_{j=1}^{k} g_{\sigma_{x,i}(j)} \right) \quad (i = 1, \ldots, a).$$

2. Enciphering/Deciphering Process (1) The broadcasting station randomly selects an integer $\underline{r} \; (0 \leq r \leq L)$ by use of the random number generator 501 in the broadcasting station side apparatus 500 so that $$0 < \left( \prod_{j=1}^{k} g_{\sigma'_{x,i}(j)} \right)^{rr'} \bmod N \leq \min\{N_{\sigma'_{x,i}} | \forall x, \sigma'_x\}$$

$(i = 1, \ldots, a)$ is satisfied, and generates a data enciphered key $K = f(g_1 g_2 \ldots g_m)^{rr'} \bmod N$ by use of the power multiplier 504, the residue operator 505 and the key generating unit 506. Further, the broadcasting station calculates $W = (w_{ij}), w_{ij} = v_{ij}^r \bmod N \; (1 \leq i, j \leq M)$ and makes the multi-address transmission of an enciphered sentence C=E(K:P) obtained by enciphering data P by the key K by use of the enciphering/deciphering unit 507 and the data W. Therein, $\underline{f}$ is a key generation function of a confidential key enciphering system opened to the public. Further, the broadcasting station generates $V_{80} = \{u_{\sigma_x} | x \in R_\lambda\}$ for each $\lambda \in \Lambda$ by use of the arithmetic unit 503 and the residue operator 505 in the broadcasting station side apparatus 500, obtains an enciphered sentence $C_\lambda = E(K(S_\lambda): V_\lambda)$ by enciphering $V_\lambda$ by a key $K(S_\lambda)$ by use of the enciphering/deciphering unit 507 and transmits $C_\lambda$ to the server 700 $(S_\lambda)$ by use of the communication unit 508. The key $K(S_\lambda)$ is shared between the broadcasting station and the server 700 $(S_\lambda)$ beforehand.

(2) In order to see the data P, a receiver $\underline{x}$ uses the communication unit 606 in the receiver side apparatus 600

(see FIG. 7) to make access to a server 700 in an area to which the receiver belongs. And, the receiver uses the authentication unit 605 in the receiver side apparatus 600 (and the server 700 uses the authentication unit 704) to make the authentication by demonstrating the possession of the confidential information $s_{\sigma_x}$. If the authentication is materialized, the server 700 transmits $u_{\sigma_x}$ in the memory 703 to the receiver side apparatus 600 of the receiver $\underline{x}$ by use of the communication unit 701.

At this time, in the case where the data P is onerous, the server 700 performs a process for account to the receiver $\underline{x}$ by use of the accounting unit 705.

(3) The receiver side apparatus 600 of the receiver $\underline{x}$ calculates a data enciphered key K from $s_{\sigma_x}$ in the memory 601 by use of the power multiplier 602, the residue operator 603 and the key generating unit 607 in accordance with $$K = \prod_{i=1}^{a} k_i \bmod N$$

and deciphers the data P from the enciphered sentence C by use of the enciphering/deciphering unit 608, wherein $$K_t = \prod_{i=1}^{k}\left(\prod_{j=1}^{k} u_{\sigma_{x,t}(j)\sigma_{x,t}(i)}\right)^{s\sigma_{x,t}(i)} \bmod N_{\sigma'_{x,t}}$$

$(1 \leq t \leq a)$.

Like the third embodiment, a method for authentication by the receiver $\underline{x}$ for the server 700 in (2) of the above-mentioned enciphering/deciphering process can rely upon a known authentication system, so far as it is a method with which the authentication is not materialized if the receiver $\underline{x}$ does not know $s_{\sigma_x}$.

In the fourth embodiment, one condition for generation of a secure key may be $$\sum_{i=1}^{k} u_{\sigma_{x,j}(i)} s_{\sigma_{x,j}(i)} h_{\sigma_{x,j}(i)}(e_1, \ldots, e_n) \not\equiv r' (\bmod \tilde{L}_{\sigma'_{x,j}})$$

$$\tilde{L}_{\sigma'_{x,j}} = lcm\left(ord_{N_{\sigma'_{x,j}}}\left(g_{\sigma_{x,j}(1)}\right), \ldots, ord_{N_{\sigma'_{x,j}}}\left(g_{\sigma_{x,j}(k)}\right)\right)$$

$(j = 1, \ldots, a)$

According to the present embodiment, the identification of a set of receivers sharing a key is made by distributing $u_{\sigma_x}$ to only limited receivers. Thereby, the key distribution for a limited secure broadcast communication becomes possible.

(Fifth Embodiment)

In a fifth embodiment, the data enciphered key K in the third and fourth embodiments is updated by changing the value of $\underline{r}$ in the data enciphered key $K=f(g^{rr'} \bmod N)$ for each short time period.

Further, the identification of transmit data subjected to multi-address transmission by a broadcasting station is made by taking a value characteristic of transmit data as the value of r'. Namely, information $u_{x,\tau}$ (or $u_{\sigma_x}$) obtained by a receiver $\underline{x}$ from a server 700 in order to looking and listening certain broadcast data is characteristic of that broadcast data information and it is necessary to obtain another information $u'_{x,\tau}$ (or $u'_{\sigma_x}$) from the server 700 in order to look and listen another broadcast data. Thereby, the identification of broadcast data subjected to an accounting process is made.

(Sixth Embodiment)

In the present embodiment, description will be made of a method in which in the case where in the third embodiment the receiver possesses an IC card 800 (see FIG. 9) having key information and connects the IC card 800 to the IC card connection unit 609 in the receiver side apparatus 600 (see FIG. 7) to obtain data from the broadcasting station, the calculation of $$K = \prod_{i=1}^{d} z_{\tau(i)}^{u_{x,\tau(i)} s_{x,\tau(i)}} \bmod N$$

by the receiver $\underline{x}$ in the step (3) of the enciphering/deciphering process in the third embodiment is performed with a high efficiency.

The receiver side apparatus 600 (see FIG. 7) calculates $$\xi_{x,\tau(i)} = z_{\tau(i)}^{u_{x,\tau(i)}} \bmod N \quad (1 \leq i \leq d)$$

by use of the residue operator 603 and the arithmetic unit 604 and outputs $\xi_{x,\tau(i)}$ ($1 \leq i \leq d$) to the IC card 800 (see FIG. 9).

The IC card 800 calculates $$\eta_{x,\tau(i)} = \xi_{x,\tau(i)}^{s_{x,\tau(i)}} \bmod N \quad (1 \leq i \leq d)$$

by use of the power multiplier 802 and the residue operator 803 and outputs $\eta_{x,\tau(i)}$ ($1 \leq i \leq d$) to the receiver side apparatus 600.

The receiver side apparatus 600 calculates $$K = \prod_{i=1}^{d} \eta_{x,\tau(i)} \bmod N.$$

by use of the power multiplier 602, the residue operator 603 and the arithmetic unit 604.

(Seventh Embodiment)

The present embodiment is an example in which in the case where in the fourth embodiment the receiver $\underline{x}$ possesses an IC card 800 (see FIG. 9) having key information and connects the IC card 800 to the IC card connection unit 609 in the receiver side apparatus 600 (see FIG. 7) to obtain data from the broadcasting station, means for improving the efficiency of the calculation of the data enciphered key in the step (3) of the enciphering/deciphering process in the fourth embodiment is provided as in the sixth embodiment. Namely, a processing for calculation using confidential information is performed in the IC card 800 while a processing for calculation using no confidential information is performed in the receiver side apparatus 600.

(Eighth Embodiment)

The present embodiment corresponds to a specific case of the fourth embodiment.

A set R of receivers is $R = \bigcup_{\lambda \in \Lambda} R_\lambda$ for a family $\{R_\lambda\}_{\lambda \in \Lambda}$ of subsets and a server $S_\lambda$ is provided corresponding to each subset $R_\lambda$.

1. Preparatory Process

A broadcasting station generates the following information by use of the random number generator 501, the prime number generator 502, the arithmetic unit 503, the power multiplier 504 and the residue operator 505 in the broadcasting station side apparatus 500 (see FIG. 6).

Confidential information:

$P, Q$: prime number $e_i \in Z, 0 < e_i < L = lcm(P-1, Q-1)(1 \leq i \leq m)$

Public information:

$N = PQ$

The broadcasting station opens only the public information to the public.

Further, the broadcasting station generates $S_{x(\pi,\sigma)}=(S_{x,\pi_1(1)}, \ldots, S_{x,\pi_1(h)}, \ldots, S_{x,\pi_l(1)}, \ldots, S_{x,\pi_l(h)})$ by use of the random number generator 501 and distributes $s_{x,(\pi,\sigma)}$ as key information of a receiver $\underline{x}$. The broadcasting station generates a random number r' ($0 \leq r' \leq L$) for $\pi=(\pi_1, \ldots, \pi_l) \in R_{k,n}$, $\sigma=(\sigma_1, \ldots, \sigma_l) \in S_{k,n}$ by use of the random number generator 501 in the broadcasting station side apparatus 500 and calculates $r_{x,(\pi,\sigma)}=(r_{x,\pi_1(1)}, \ldots, r_{x,\pi_1(h)}, \ldots, r_{x,\pi_l(1)}, \ldots, r_{x,\pi_l(h)})$ satisfying $$\sum_{i=1}^{k} r_{x,\pi_i(j)} s_{x,\pi_i(j)} e_{\pi_i(j)} \equiv r' (\text{mod} L_{\sigma_i})$$

$(1 \leq i \leq l)$ by use of the arithmetic unit 503 and the residue operator 505. Therein, $L_{\sigma_i}$ satisfies $$L_{\sigma_i} = ord_N \left( \prod_{j=1}^{k} g_{\sigma_i(j)} \right) \quad (1 \leq i \leq l).$$

Also, when $\sigma=(\sigma_1, \ldots, \sigma_l)$ $\sigma'=(\sigma'_1, \ldots, \sigma'_l) \in S'_{k,n}$ for n=kl, set $R_{k,n}=\{\pi=(\pi_1, \ldots, \pi_l)|\text{one-to-one map } \pi_i:\{1, 2, \ldots, h\} \to \{1, 2, \ldots, m\} \ (1 \leq i \leq l, 1 \leq h \leq m)\}$, set $S'_{k,n}=\{\sigma=(\sigma_1, \ldots, \sigma_l)|\text{one-to-one map } \sigma_i:A=\{1, 2, \ldots, k\} \to B=\{1, 2, \ldots, n\} \ (1 \leq i \leq l), \sigma_1(A) \cup \ldots \cup \sigma_l(A)=B\}$, a relation $$\sigma \sim \sigma' \overset{def}{\Longleftrightarrow} \sigma_i(A) = \sigma'_{\tau(i)}(A) \quad (1 \leq i \leq l)$$

is defined in regard to proper permutation $\tau$ on a set $\{1, 2, \ldots, l\}$. At this time, "~" represents an equivalent relation on $S'_{k,n}$ and $S_{k,n}$ is $S_{k,n}=S'_{k,n}/\sim$.

2. Enciphering/Deciphering Process (1) The broadcasting station randomly selects an integer $\underline{r}$ ($0 \leq r \leq L$) by use of the random number generator 501 in the broadcasting station side apparatus 500 to generate a data enciphered key $K=f(g_1 g_2 \cdots g_n)^{rr'} \mod N$ by use of the power multiplier 504, the residue operator 505 and the key generating unit 506. Further, the broadcasting station calculates $W=(y_{ij}), y_{ij}=u_{ij}^r \mod N (1 \leq i \leq m, 1 \leq j \leq n)$ and makes the multi-address transmission of an enciphered sentence $C=E(K:P)$ obtained by enciphering data P by the key K by use of the enciphering/deciphering unit 507 and the data W. Therein, $\underline{f}$ is a key generation function of a confidential key enciphering system opened to the public. Further, the broadcasting station generates $V_\lambda = \{r_{x,(\pi,\sigma)} | x \in R_\lambda\}$ for each $\lambda \in \Lambda$ by use of the arithmetic unit 503 and the residue operator 505 in the broadcasting station side apparatus 500, obtains an enciphered sentence $C_\lambda = E(K(S_\lambda):V_\lambda)$ by enciphering $V_\lambda$ by a key $K(S_\lambda)$ by use of the enciphering/deciphering unit 507 and transmits $C_\lambda$ to the server 700 ($S_\lambda$) by use of the communication unit 508. The key $K(S_\lambda)$ is shared between the broadcasting station and the server 700 ($S_\lambda$) beforehand.

(2) In order to see the data P, a receiver $\underline{x}$ uses the communication unit 606 in the receiver side apparatus 600 to make access to a server 700 (see FIG. 8) in an area to which the receiver belongs. And, the receiver uses the authentication unit 605 in the receiver side apparatus 600 (and the server 700 uses the authentication unit 704) to make the authentication by demonstrating the possession of the confidential information $s_\sigma$. If the authentication is materialized, the server 700 transmits $r_{x,(\pi,\sigma)}$ in the memory 703 to the receiver side apparatus 600 of the receiver $\underline{x}$ by use of the communication unit 701.

At this time, in the case where the data P is onerous, the server 700 performs a process for account to the receiver $\underline{x}$ by use of the accounting unit 705.

(3) The receiver side apparatus 600 of the receiver $\underline{x}$ calculates a data enciphered key K from $s_{x,(\pi,\sigma)}$ in the memory 601 by use of the power multiplier 602, the residue operator 603 and the key generating unit 607 in accordance with $$K = f\left( \prod_{i=1}^{l} \prod_{p=1}^{h} \prod_{q=1}^{k} y_{\pi_i(p)\sigma_i(q)}^{r_{x,\pi_i(p)} s_{x,\pi_i(p)}} \mod N \right)$$

and deciphers the data P from the enciphered sentence C by use of the enciphering/deciphering unit 608.

Like the third embodiment, a method for authentication by the receiver $\underline{x}$ for the server 700 in (2) of the above-mentioned enciphering/deciphering process can rely upon a known authentication system, so far as it is a method with which the authentication is not materialized if the receiver $\underline{x}$ does not know $s_{x,(\pi,\sigma)}$.

The present invention is applicable to a multi-channel broadcasting satellite digital communication system, a TV conference system using a satellite, a CATV, a multi-media information distribution system, and so forth.

Accordingly, the present invention is not limited to the disclosed embodiments and includes various modifications in the scope of Claims.

What is claimed is:

1. A cipher communication system comprising:

a server;

a plurality of receiver units connected to said server; and a broadcasting station which performs communications with designated receiver units of said plurality of receiver units, via said server, wherein said broadcasting station comprises:

a unit for generating confidential key information and preliminarily distributing said confidential key information to said plurality of receiver units;

a unit for encrypting data (P) to be transmitted with encrypting common key (K) and generating encrypted text (C);

a unit for generating key distribution data (W) necessary for calculation of said common key (K);

a unit for broadcasting said encrypted text (C) and said key distribution data (W);

a unit for generating individual information per individual receiver unit to be transmitted to said designated receiver units; and a unit for transmitting said individual information to said server, wherein said server comprises:

a unit for receiving said individual information from said broadcasting station;

a unit for receiving authentication data from a receiver unit and performing authentication; and a unit for transmitting said individual information to a corresponding receiver unit when authentication is made, and wherein said receiver units each comprises:

a unit for transmitting authentication data to said server; and a unit for calculating said common key (K) on a basis of said individual information transmitted from said server, said confidential key information preliminarily distributed from said broadcasting station and said key distribution data (W) broadcasted from said broadcasting station, and for decoding said data (P) from said encrypted text (C).

2. A cipher communication system according to claim 1, wherein said unit for distributing said confidential key information, at said broadcasting station, to said plurality of receiver units comprises a unit for generating confidential key information of a receiver unit in association with a subset inclusive of at least two elements of a finite set (S) of confidential key information of said receiver unit; and a unit for distributing said confidential key information to said plurality of receiver units, and wherein said key distribution data (W) is generated in association with each element of said finite set (S).

3. A cipher communication system according to claim 1, wherein said individual information at the broadcasting station is encrypted with said common key before transmission to said designated receiver units.

4. A cipher communication system according to claim 1, wherein said receiver units each further includes a unit for generating authentication data including said confidential key information which is preliminarily distributed from said broadcasting station.

5. A cipher communication system according to claim 1, wherein said server includes an accounting unit for charging a fee for data (P) for a receiver unit when said data (P) encrypted using said common key (K) is onerous indicating that a fee is required.

6. A cipher communication system according to claim 1, wherein said broadcasting station further includes a unit for modifying a value of said common key (K) by modifying said key distribution data (W).

7. A cipher communication system according to claim 2, wherein said key distribution data (W) is generated by adding an arbitrarily selected random number with a value corresponding to the element of said finite set (S).

8. A cipher communication system according to claim 1, wherein said broadcasting station further includes an arbitrarily selected random number used for generating said common key (K).

9. A cipher communication system according to claim 7, wherein said broadcasting station further includes a unit for modifying said common key (K) by varying the value of said random number.

10. A cipher communication system according to claim 7, wherein said broadcasting station further includes a unit for performing identification of transmission data by comparing a value of said random number to a value unique for said transmission data.

11. A cipher communication system, comprising:

a broadcasting station;

a server; and a plurality of receiver units connected to said server, each configured to decode an encrypted data broadcasted from said broadcasting station by obtaining permission information from said server, wherein said server comprises:

a unit for storing individual information per receiver unit transmitted from a broadcasting station;

a unit for receiving authentication data from a receiver unit and performing authentication; and a unit for transmitting said individual information to a corresponding receiver unit when authentication is made, wherein said receiver units each comprises:

a unit for transmitting authentication data to said server; and a unit for decoding said encrypted data on a basis of said individual information transmitted from said server and key information transmitted from said broadcasting station.

12. A cipher communication system according to claim 11, wherein said key information transmitted from said broadcasting station includes confidential key information preliminarily transmitted and broadcasted key information.

13. A cipher communication system according to claim 11, wherein said server includes an accounting unit for charging a fee for said encrypted data for a receiver unit when said encrypted data is onerous indicating that a fee is required.

14. A cipher communication method including a server, a plurality of receiver units connected to said server, a broadcasting station which performs communications with designated receiver units, comprising:

generating, at said broadcasting station, confidential key information and preliminarily distributing said confidential key information to said plurality of receiver units;

generating, at said broadcasting station, encrypted text (C) by encrypting data (P) to be transmitted with encrypting common key (K), and generating key distribution data (W) necessary for calculation of said common key (K);

broadcasting, at said broadcasting station, said encrypted text (C) and said key distribution data (W);

generating, at said broadcasting station, individual information per individual receiver unit to be transmitted to said designated receiver units, and transmitting said individual information to said server;

receiving, at said server, said individual information transmitted from said broadcasting station;

receiving, at said server, authentication data from a receiver unit and performing authentication; and transmitting, at said server, said individual information to a corresponding receiver unit when authentication is made;

transmitting, at said receiver unit, said authentication data to said server; and calculating, at said receiver unit, said common key (K) on a basis of said individual information transmitted from said server, said confidential key information preliminarily distributed from said broadcasting station and said key distribution data (W) broadcasted from said broadcasting station, and decoding said data (P) from said encrypted text (C).

15. A cipher communication method according to claim 14, wherein said individual information is generated and transmitted from said broadcasting station to said server before said key distribution data (W) is generated and broadcasted from said broadcasting station.

16. A cipher communication method according to claim 14, wherein said key distribution data (W) is generated and broadcasted from said broadcasting station before said individual information is generated and transmitted from said broadcasting station to said server.

17. A cipher communication method according to claim 14, wherein said step of preliminarily distributing said confidential key information in said broadcasting station side to said plurality of receiver units includes:
generating confidential key information of a receiver unit in association with a subset inclusive of at least two elements of a finite set (S) of confidential key information of said receiver unit; and
distributing said confidential key information to said plurality of receiver units,
wherein said key distribution data (W) is generated in association with each element of said finite set (S).

18. A cipher communication method according to claim 14, wherein said individual information at the broadcasting station is encrypted with said common key before transmission to said designated receiver units.

19. A cipher communication method according to claim 14, further comprising a step of generating, at said receiver unit, authentication data including said confidential key information which is preliminarily distributed from said broadcasting station.

20. A cipher communication method according to claim 14, further comprising a step of accounting, at said server, for charging a fee for data (P) for a receiver unit when said data (P) encrypted using said common key (K) is onerous indicating that a fee is required.

21. A cipher communication method according to claim 14, further comprising a step of modifying, at said broadcasting station, a value of said common key (K) by modifying said key distribution data (W).

22. A cipher communication method according to claim 17, wherein said key distribution data (W) is generated by adding an arbitrarily selected random number for a value corresponding to the element of said finite set (S).

23. A cipher communication method according to claim 14, further comprising a step of generating, at said broadcasting station, said common key (K) including an arbitrarily selected random number.

24. A cipher communication method according to claim 23, further comprising a step of modifying, at said broadcasting station, said common key (K) by varying the value of said random number.

25. A cipher communication method according to claim 23, further comprising a step of performing, at said broadcasting station, identification of transmission data by comparing a value of said random number to a value unique for said transmission data.

26. A cipher communication method including a broadcasting station, a server and a plurality of receiver units connected to said server, each adapted to decode an encrypted data broadcasted from said broadcasting station by obtaining permission information from said server, comprising:
storing, at said server, individual information per receiver unit transmitted from said broadcasting station;
receiving, at said server, authentication data from a receiver unit for performing authentication;
transmitting, at said server, said individual information to a corresponding receiver unit when authentication is made;
transmitting, at said receiver unit, authentication data to said server; and
decoding, at said receiver unit, said encrypted data on a basis of said individual information transmitted from said server and key information transmitted from said broadcasting station.

27. A cipher communication method according to claim 26, further comprising a step of decoding, at said receiver unit, said encrypted data on a basis of said individual information transmitted from said server, confidential key information preliminarily transmitted from said broadcasting station and broadcasted key information.

28. A cipher communication method according to claim 26, further comprising a step of accounting, at said server, for charging a fee for said encrypted data for a receiver unit when said encrypted data is onerous indicating that a fee is required.

* * * * *